June 29, 1965 W. HENN ETAL 3,192,374

CARRIER SIGNAL ATTENUATION

Filed Sept. 30, 1960 3 Sheets-Sheet 1

INVENTORS
WILLIAM HENN
MENASHE TEITELBAUM
BY Charles J. Worth
AGENT

INVENTORS
WILLIAM HENN
MENASHE TEITELBAUM
BY Charles J. Worth
AGENT

INVENTORS
WILLIAM HENN
MENASHE TEITELBAUM
BY Charles J. Worth
AGENT

United States Patent Office 3,192,374
Patented June 29, 1965

3,192,374
CARRIER SIGNAL ATTENUATION

William Henn, Hasbrouck Heights, N.J., and Menashe Teitelbaum, Brooklyn, N.Y., assignors to The Bendix Corporation, Teterboro, N.J., a corporation of Delaware
Filed Sept. 30, 1960, Ser. No. 59,718
13 Claims. (Cl. 235—197)

Figures 1, 1A:
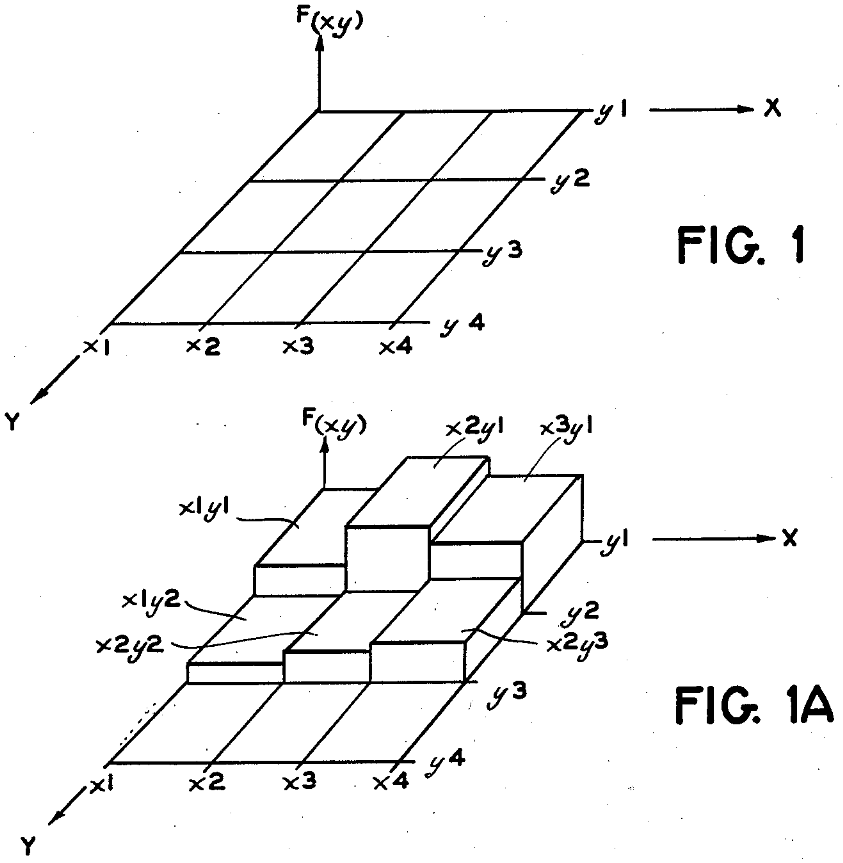

This invention relates to signal adjustment techniques and more specifically to resistor matrix and diode gating means for attentuating alternating voltage signals as a discrete step function of two independent variables.

The novel device is particularly adapted for use in solid state computer systems where discrete step functions of independent variables can be tolerated thus eliminating the need for relatively sophisticated devices to provide continuously varying transfer functions. A matrix array is an ideal approach for working with discrete steps of variables and facilitates derivation of parametric gain by finite quantization. Utilization of this approach appers to have good potential because of solid state implementation which is not limited to attenuation of only a single carrier signal.

One form of the novel device may be applied to control systems for vehicles capable of flight. It is well-known that the amount of control required in response to commands for controlling the flight path of such a vehicle varies with speed and altitude so that the command signal must vary as a function of two independent variables. Such vehicles are controlled simultaneously about three axes, each control being subject to the effects of the variables thus providing the requirement for simultaneously varying multiple carrier signals.

An object of this invention is to provide a device for attenuating a carrier signal according to a transfer characteristic as a discrete step function of independence variables.

Another object of this invention is to provide the aforementioned device for simultaneously attenuating a plurality of carrier signals as a discrete step function of independent variables.

Another object of this invention is to provide a solid state carrier signal attenuating device responsive to discrete step signals as a function of variables which is light in weight, compact in structure and has high reliability.

Another object of this invention is to provide a solid state, diode gated, resistor matrix array for attenuating carrier signals as a discrete step function of two variables.

This invention contemplates a solid state device for attenuating at least one carrier signal or alternating voltage according to a transfer characteristic as a discrete step function of variables. Network means, such as a matrix array, singularly derives control signals in response to discrete step signals as a function of each of the variables. An attenuation network is connected to the matrix and is responsive to each of the control signals for attenuating the carrier signal accordingly.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for the purpose of illustration and description only, and are not intended as a definition of the limits of the invention.

Figure 2:
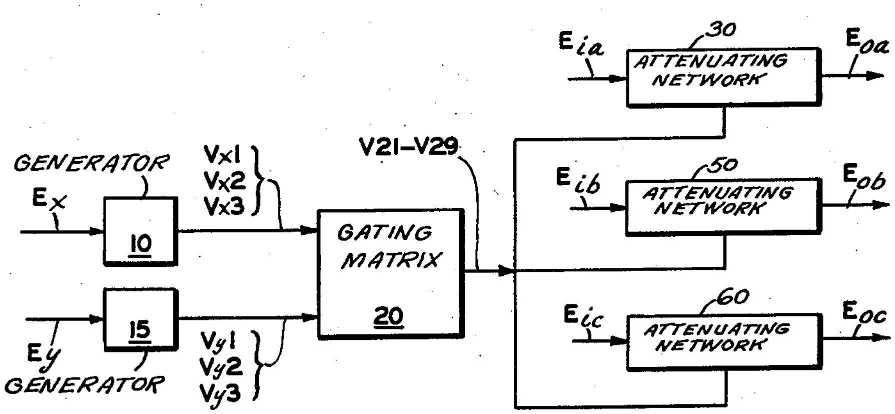
Figure 3:
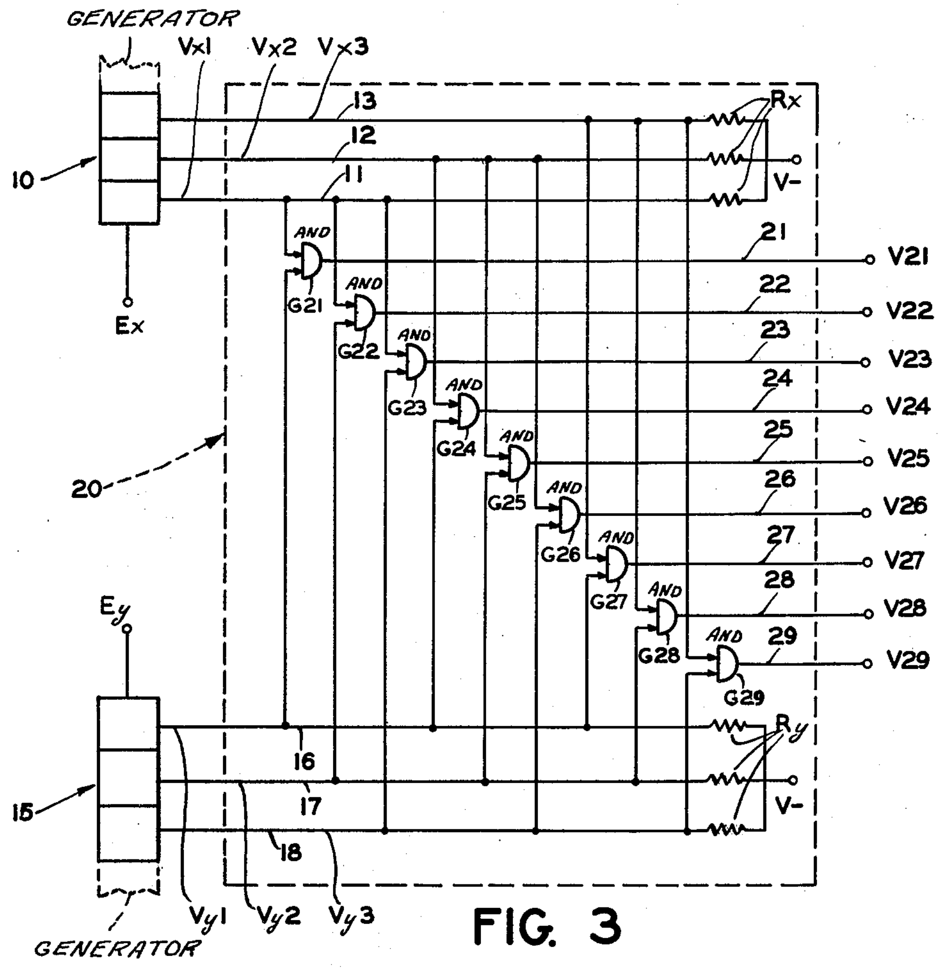
Figure 4:
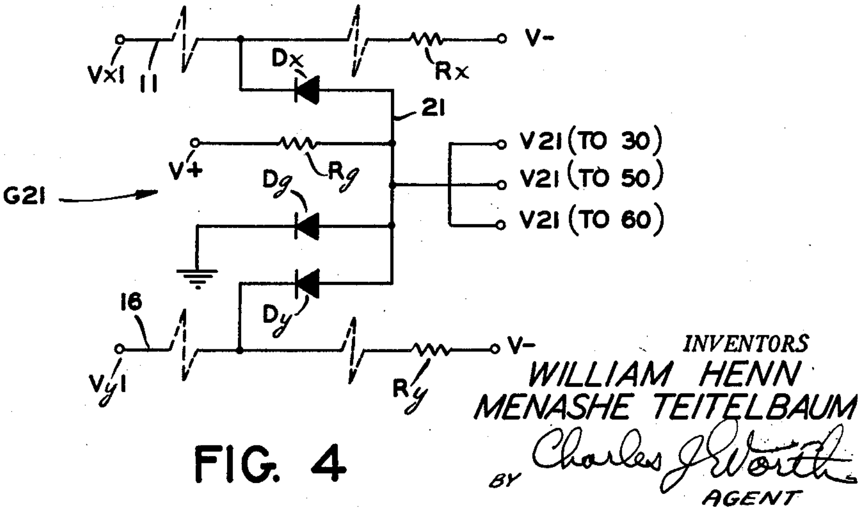
Figure 5:
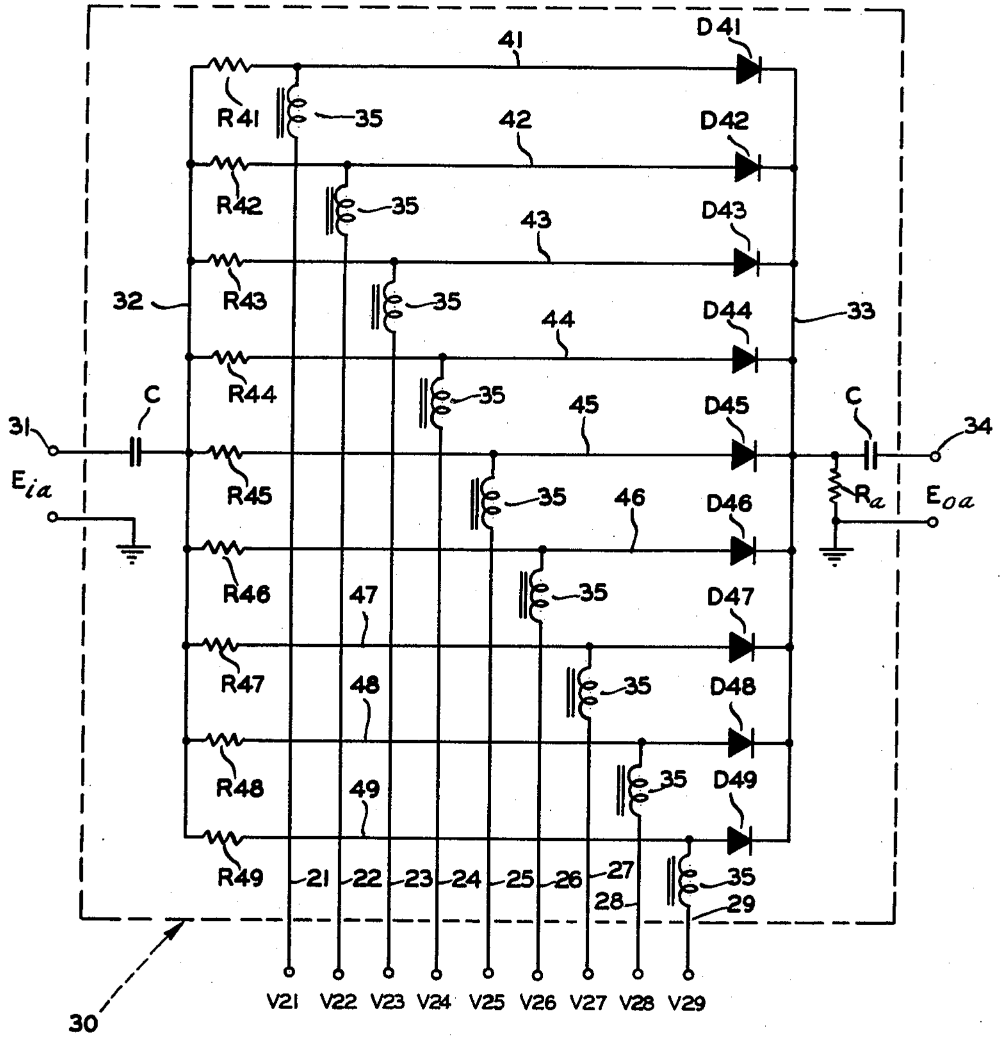

FIGURE 1 is a perspective view illustrating in two dimensions discrete steps of two independent variables, FIGURE 1A is a perspective view corresponding to FIGURE 1 and illustrating in three dimensions discrete step values of the transfer characteristic as a function of the two independent variables, FIGURE 2 is a functional block diagram of a device constructed according to the invention for attenuating carrier signals as a discrete step function of two independent variables, FIGURE 3 is a circuit diagram of a gating matrix of the device of FIGURE 2 for deriving a control signal as a discrete step function of the variables, FIGURE 4 is a circuit diagram of a representative gate of the matrix of FIGURE 3, and, FIGURE 5 is a circuit diagram of one of the gated carrier signal attenuation networks of the device of FIGURE 3.

Referring to FIGURES 1 and 1A, two variables X and Y have discrete step values $x1$, $x2$, $x3$ and $x4$, and $y1$, $y2$, $y3$ and $y4$, respectively. The desired transfer characteristics F of the variables X and Y vary at each discrete step as shown in FIGURE 1A and, accordingly, are quantitive values as discrete step functions of both variables X and Y. Thus, where $X=x1$ and $Y=y2$ the transfer characteristic F is a function of $x1y2$. Assuming the variable X changes from $X=x1$ to $X=x2$, the transfer characteristic F is a function of $x2y2$, etc.

FIGURE 2 is a functional block diagram of the novel device for attenuating carrier signals E$ia$, E$ib$ and E$ic$ as a discrete step function of both variables X and Y represented by direct voltages E$x$ and E$y$, respectively. Voltages E$x$ and E$y$ are applied to generators 10 and 15, respectively, which singularly derive discrete step signals V$x1$, V$x2$ or V$x3$, and V$y1$, V$y2$ or V$y3$ that are applied to a gating matrix 20. The generators 10 and 15 may be of the character shown and described in copending U.S. patent application Serial No. 39,290 of W. Henn and M. Teitelbaum, filed June 28, 1960 and assigned to the same assignee as the present application. The matrix 20 singularly derives control voltages V21 to V29, in response to the discrete step signals V$x1$, V$x2$ or V$x3$, and V$y1$, V$y2$ or V$y3$, that are applied to control gated attenuating networks 30, 50 and 60 which receive carrier signals E$ia$, E$ib$ and E$ic$, respectively. Networks 30, 50 and 60 attenuate the respective carrier signals E$ia$, E$ib$ and E$ic$ in response to the control signals V21 to V29 according to discrete step transfer characteristics as a function of the variables to derive attenuated carrier signals E$oa$, E$ob$ and E$oc$, respectively.

Referring to FIGURE 3, generator 10 has output lines 11, 12 and 13 forming a network of matrix read-in lines, each being connected to a negative voltage source V— by a resistor R$x$ and singularly transmitting discrete step signals V$x1$, V$x2$ and V$x3$, respectively, as a function of the variable X. The signals V$x1$, V$x2$ and V$x3$ are positive direct voltages of equal amplitude. Similarly, generator 15 has output lines 16, 17 and 18 forming a second network of matrix read-in lines, each being connected to a negative voltage source V— by a resistor R$y$ and singularly transmitting discrete step signals V$y1$, V$y2$ and V$y3$, respectively, as a function of the variable Y. The signals V$y1$, V$y2$ and V$y3$ are also positive direct voltages of equal amplitude. Generators 10 and 15 and the various components of the novel device are limited in number to facilitate describing the invention with no intent to define a limitation thereof.

Lines 11, 12 and 13 are each connected to the inputs of three AND gates G21, G22 and G23; G24, G25 and G26; and G27, G28 and G29; respectively, while lines 16, 17 and 18 are each connected to the inputs of three of the AND gates G21, G24 and G27; G22, G25 and G28; and G23, G26 and G29; respectively, to form the gating matrix 20. The gates G21 to G29 are selectively qualified to singularly transmit the positive direct voltage control signals V21 to V29, respectively, at their respective outputs 21 to 29 by receiving one signal $Vx1$, $Vx2$ or $Vx3$ simultaneously with one signal $Vy1$, $Vy2$ or $Vy3$. The AND gate outputs 21 to 29 are singularly connected to attenuating circuits 41 to 49, respectively (see FIGURE 5) of each of the diode gated, carrier signal attenuating networks 30, 50 and 60. Networks 50 and 60 are duplications of network 30 and, accordingly, only the latter network is shown in detail in FIGURE 5 and will be discussed further.

All of the AND gates G21 to G29 have the same construction and, accordingly, only gate G21 is shown in detail in FIGURE 4 and will now be described. Gate G21 has a pair of diodes $Dx$ and $Dy$ connecting lines 11 and 16, respectively, to the gate output 21, and back biased to a non-conducting state by the respective discrete step signals $Vx1$ and $Vy1$. Gate output 21 is clamped to ground by a diode $Dg$ disposed in opposition to diodes $Dx$ and $Dy$, and is connected to a positive voltage source V+ by a resistor $Rg$. When diodes $Dx$ and $Dy$ are simultaneously back biased by signals $Vx1$ and $Vy1$, respectively, source V+ provides control signal V21 at the gate output 21. In the absence of either or both signals $Vx1$ and $Vy1$, direct voltage source V+ is connected to the negative direct voltage source V− by resistor $Rg$, line 21, diode $Dx$, line 11 and resistor $Rx$, and/or resistor $Rg$, line 21, diode $Dy$, line 16 and resistor $Ry$. Diode $Dg$ merely prevents the gate output 21 from going negative in the absence of signal $Vx1$ and/or $Vy1$. The output 21 of gate G21 is shown trifurcated in FIGURE 4 to provide a connection to each of the signal attenuating networks 30, 50 and 60. The number of gate output branch lines required by each of the gates G21 to G29 is determined by the number of networks having a carrier signal attenuating circuit to be controlled by the signal provided by the particular gate.

The diode gated, carrier signal attenuating network 30 is shown in FIGURE 5 and is representative of networks 50 and 60 not described in detail to eliminate duplication. Network 30 has an input 31, to receive the carrier signal $Eia$, which is connected to all of the carrier signal attenuation circuits 41 to 49 by a common line 32. All of the circuits 41 to 49 are connected to an output 34, forming parallel gated paths for signal transmission, by a common line 33 also connected to a point of zero potential by a resistor $Ra$. Each of the circuits 41 to 49 includes a resistor and a gating diode identified by letters R and D, respectively, having a numeral suffix corresponding to the number of the circuit. A choke coil 35 connects each AND gate output line 21 to 29 to the associated circuit 41 to 49 and serves to keep the alternating voltage $Eia$ from the control voltage source. Capacitors C are connected to and isolate input 31 and output 34 of network 30 from the direct voltage control signals V21 to V29 applied to respective circuits 41 to 49 to forward current bias diodes D41 to D49, respectively.

Each of the resistors R41 to R49 has a predetermined value and with resistor $Ra$ forms a voltage dividing resistor network for attenuating carrier signal $Eia$ according to a desired discrete step transfer characteristic F as a function of the variables X and Y. The attenuation thus derived by any of the circuits 41 to 49, when its associated diode D41 to D49 is conducting the carrier signal $Eia$, is equal to the value of the common resistor $Ra$ divided by the sum of the common resistor $Ra$ and the associated resistor R41 to R49; i.e.: $Ra/Ra+R41$, $Ra/Ra+R42$, $Ra/Ra+R43$, etc.

Inasmuch as generators 10 and 15 each singularly apply discrete step signals $Vx1$, $Vx2$ or $Vx3$, and $Vy1$, $Vy2$ or $Vy3$, respectively, to matrix 20, AND gates G21 to G29 are singularly qualified to apply respective control signals V21 to V29 to network 30. The control signals V21 to V29 forward current bias respective gating diodes D41 to D49 of the associated circuits 41 to 49 when connected to a qualified AND gate, and simultaneously provides sufficient potential at line 33 to back bias the remaining gating diodes. The one circuit 41 to 49 having the forward current biased diode D41 to D49, respectively, attenuates carrier signal $Eia$ received at input 31 to provide the attenuated carrier signal $Eoa$ at the output 34 as a discrete step function of the variables X and Y.

As an example, consider the attenuation of carrier signal $Eia$ when the variables $X=x1$ and $Y=yl$. Generator 10 derives discrete step signal $Vx1$ in response to the direct voltage $Ex$ representing the variable X, and applies signal $Vx1$ to AND gates G21, G22 and G23 of matrix 20 by line 11. Simultaneously, generator 15 derives discrete step signal $Vy1$ in response to the direct voltage $Ey$ representing the variable Y, and applies signal $Vy1$ to AND gates G21, G24 and G27 of matrix 20 by line 16. Only AND gate G21 receives both discrete step signals $Vx1$ and $Vy1$ and therefore is the only gate qualified to transmit its output control signal V21 to network 30 for forward current biasing diode D41 and providing potential at line 33 to back bias the rest of the circuit gating diodes D42 to D49. With diode D41 forward biased to conduct, circuit 41 including resistor R41 and common resistor $Ra$ attenuates carrier signal $Eia$ received at input 31 to derive the attenuated carrier signal $$Eoa=(Ra/Ra+R41)Eia$$

or $(Fx1y1)Eia$ at output 34 as a discrete step function of the variables X and Y.

Assuming the variable X changes from $X=x1$ to $X=x2$, generator 10 now derives discrete step signal $Vx2$ in response to voltage $Ex$ and simultaneously rescinds discrete step signal $Vx1$. Rescinded signal $Vx1$ disqualifies gate G21 and signal V21 is no longer applied to forward current bias diode D41. Therefore, circuit 41 no longer attenuates the carrier signal $Eia$ to provide the attenuated carrier signal $Eoa=(Ra/Ra+R41)Eia$. Discrete step signal $Vx2$ is applied to AND gates G24, G25 and G26, qualifying only gate G24 receiving signal $Vy1$. Gate G24 applies its output control signal V24 to network 30 to forward current bias diode D44 and provide potential at line 33 to back bias the remaining gating diodes. With diode D44 forward biased to conduct, circuit 44 including resistor R44 and common resistor $Ra$ attenuates carrier signal $Eia$ to derive the attenuated carrier signal $$Eoa=(Ra/Ra+R44)Eia$$

or $(Fx2y1)Eia$ at output 34 as a discrete step function of the variables X and Y.

Assuming the variable X remains $X=x2$ and the variable Y changes from $Y=y1$ to $Y=y2$, generator 15 derives discrete step signal $Vy2$ in response to voltage $Ey$ and simultaneously rescinds discrete step signal $Vy1$. Rescinded signal $Vy1$ disqualifies gate G24 and signal V24 is no longer applied to forward current bias diode D24. Therefore, circuit 44 no longer attenuates the carrier signal $Eia$ to provide attenuated carrier signal $$Eoa=(Ra/Ra+R44)Eia$$

Discrete step signal $Ey2$ is applied to AND gates G22, G25 and G27, qualifying only gate G25 receiving discrete step signal $Vx2$. Gate G25 applies its output control signal V25 to network 30 to forward bias diode D45 and provide potential at line 33 to back bias the remaining gating diodes. With diode D45 forward biased to conduct, circuit 45 including resistor R45 and common resistor $Ra$ attenuates carrier signal $Eia$ to derive the attenuated carrier signal $Eoa=(Ra/Ra+R45)Eia$, or $(Fx2y2)Eia$ at output 34 as a discrete step function of the variable X and Y.

Although not shown, the capacitor C connected to the input 31 of network 30 can be replaced by a similar capacitor in each of the circuits 41 and 49 between the connection to the common input connecting line and each of the resistors R41 to R49. This appears to be advantageous in reducing direct current drain by the network 30 by isolating the input portions of the circuits 41 to 49 from each other as well as from the common input 31.

It should now be readily understood that the invention has been described in one form as a solid state device comprising a diode gated matrix array of voltage dividing resistor networks for attenuating one or more carrier signals as a discrete step function of two variables.

Although only one embodiment of the invention has been illustrated and described in detail, it is to be expressly understood that the invention is not limited thereto. Various changes can be made in the design and arrangement of the parts without departing from the spirit and scope of the invention as will now be understood by those skilled in the art.

What is claimed is:

1. A solid state device for attenuating at least one carrier signal according to a predetermined transfer characteristic as a discrete step function of variables, comprising network means for deriving individual electric control signals for each discrete step function of the variables, and attenuating means for each carrier signal connected to the network means and responsive to one of the control signals for attenuating the associated carrier signal according to the transfer characteristic as a discrete step function of the variables.

2. A solid state device for attenuating a carrier signal according to a transfer characteristic as a discrete step function of two variables, comprising a matrix adapted to receive discrete step signals as a function of each variable to provide individual electric control signals at its output corresponding to a discrete step function of the variable, and a network of attenuating circuits adapted to receive the carrier signal and connected to the output of the matrix for receiving the control signals, each circuit being responsive to one of the control signals for attenuating the carrier signal according to the transfer characteristic of the discrete step function of the variables providing the control signal.

3. The device for attenuating a carrier signal according to claim 2, in which the attenuating network has an input common to all the circuits adapted to receive the carrier signal and an output common to all the circuits for the attenuated carrier signal.

4. A solid state device for attenuating a carrier signal according to a transfer characteristic as a discrete step function of two variables, comprising a matrix adapted to receive discrete step signals as a function of each variable to derive individual electric control signals at its output corresponding to a step function of the variable, and an attenuation network having an input adapted to receive the carrier signal, and output for the attenuated carrier signal, and a plurality of circuits connecting the input to the output, each circuit having semiconductor gating means connected to the output of the matrix and conducting the carrier signal only in response to one of the control signals, each circuit having means for attenuating the carrier signal when energized by a control signal to derive a corresponding attenuated carrier signal at the output as a discrete step function of the variables.

5. The solid state device for attenuating a carrier signal according to claim 4, in which the signal attenuating means of each circuit comprises a pair of resistors of which one is common to all of the pairs of resistors.

6. A solid state device for attenuating a carrier signal according to a predetermined transfer characteristic as a discrete step function of independent variables, comprising a network corresponding to each variable and having a plurality of read-in lines singularly transmitting signals as a discrete step function of the associated variable, gating means each interconnecting a read-in line of each network and being qualified by the associated discrete step signals to transmit a control signal at its output, and means for attenuating the carrier signal having an input adapted to receive the carrier signal, an output for the attenuated carrier signal, and a plurality of carrier signal attenuating circuits connected in parallel between the input and output each having a semiconductor gate connected to the output of one of the gating means and transmitting the carrier signal in response to the associated control signal, each circuit attenuating the carrier signal when the associated semiconductor gate is transmitting to derive a corresponding attenuated carrier signal at the output.

7. The device for attenuating a carrier signal according to claim 6, in which each attenuating circuit includes a voltage divider comprising two resistors having a resistive value corresponding to the value of the transfer characteristics of the discrete step function of the variables providing the control signal to the associated semiconductor gate.

8. The device for attenuating a carrier signal according to claim 7, in which one of the resistors of the voltage divider of each circuit is common to the voltage dividers of all the circuits.

9. A solid state device for deriving an attenuated carrier signal as a discrete step function of two independent variables, comprising a network corresponding to each variable and having a plurality of read-in lines singularly transmitting signals as a discrete step function of the associated variable, a plurality of AND gates each interconnecting a read-in line of both networks and being qualified by simultaneously receiving the discrete step signals from both of the associated read-in lines to transmit a biasing voltage at its output, and means for attenuating the carrier signal having an input adapted to receive the carrier signal, an output for the attenuated carrier signal, and a plurality of carrier signal attenuating circuits each having a diode connected to the output of one of the AND gates and being forward current biased to conduct by the associated biasing voltage to derive a corresponding attenuated carrier signal.

10. The device for deriving an attenuated carrier signal according to claim 9, in which each circuit includes a voltage divider for attenuating the carrier signal comprising two resistors of which one is common to the voltage dividers of all the circuits and is disposed between the diodes and the output so the biasing voltage applied to forward current bias one of the diodes provides a potential to back bias the diodes of all the other circuits.

11. A solid state device for attenuating a carrier signal according to a transfer characteristic in response to individual electric control signals singularly derived as a discrete step function of two variables, comprising an input adapted to receive the carrier signal, an output for the attenuated carrier signal, and a plurality of attenuating circuits connected in parallel between the input and the output, each circuit having gating means conducting the carrier signal in response to one of the control signals and providing a corresponding attenuated carrier signal at the output when the associated gating means is conducting.

12. The solid state device for attenuating a carrier signal according to claim 11, in which each circuit includes a pair of resistors and one resistor is common to all of the circuits.

13. A solid state device for attenuating a carrier signal according to a transfer characteristic in response to individual electric control signal as a discrete step function of two variables, comprising an input adapted to receive the carrier signal, an output for the attenuated signal, a plurality of resistors each having a different selected resistance value and being connected to the input, a plurality of diodes each connecting one of the resistors to the output to provide a gated path for transmitting the carrier signal from the input to the output when the associated diode is conducting, a common resistor having a selected resistance value and connecting all of the gated paths between the diodes and the output to a point of zero potential to form a voltage dividing network with each of the resistors, each voltage dividing network providing carrier signal attenuation conforming to the value of the transfer characteristic of one discrete step when the associated path is transmitting, and a plurality of lines singularly connected to the gated paths for selectively applying one of the control signals as a discrete step function of the variables to forward current bias one of the diodes to conduct and to simultaneously provide a potential to back bias all of the other diodes.

References Cited by the Examiner

UNITED STATES PATENTS

| | | | |
|---|---|---|---|
| 2,581,124 | 1/52 | Moe. | |
| 2,592,308 | 4/52 | Meacham | 178—43.5 |
| 2,658,997 | 11/53 | Carbrey et al. | 178—43.5 |
| 2,784,396 | 3/57 | Kaiser et al. | 178—43.5 |
| 2,900,137 | 8/59 | Giser | 235—194 |

OTHER REFERENCES

Pages 121–124, 8/51, vol. 24, No. 8, Step Multiplier in Guided Missile Computer, Electronics, Goldberg.

Pages 263–266, 2nd Ed. 1956, Electronic Analog Computers, Korn & Korn.

MALCOLM A. MORRISON, *Primary Examiner.*

ROBERT H. ROSE, *Examiner.*